US007868760B2

United States Patent
Smith et al.

(10) Patent No.: US 7,868,760 B2
(45) Date of Patent: Jan. 11, 2011

(54) METHOD FOR ACCOUNTING FOR PEOPLE IN EMERGENCIES IN INDUSTRIAL SETTINGS

(75) Inventors: Curt Smith, Aurora, IL (US); Steve Poirot, Girdwood, AK (US); Robert Fontana, Potomac, MD (US)

(73) Assignee: BP Corporation North America Inc., Warrenville, IL (US)

( * ) Notice: Subject to any disclaimer, the term of this patent is extended or adjusted under 35 U.S.C. 154(b) by 442 days.

(21) Appl. No.: 11/757,757

(22) Filed: Jun. 4, 2007

(65) Prior Publication Data

US 2008/0030359 A1 Feb. 7, 2008

Related U.S. Application Data

(60) Provisional application No. 60/803,952, filed on Jun. 5, 2006.

(51) Int. Cl.
*G08B 13/14* (2006.01)

(52) U.S. Cl. .............. 340/572.1; 340/10.1; 340/539.13; 340/572.4; 455/41.2

(58) Field of Classification Search .............. 340/686.1, 340/572.4, 539.13, 572.1, 10.1; 235/384; 119/721; 455/41.2
See application file for complete search history.

(56) References Cited

U.S. PATENT DOCUMENTS

| 5,661,457 | A  | * | 8/1997 | Ghaffari et al. | .......... 340/572.7 |
| 6,882,315 | B2 | * | 4/2005 | Richley et al. | .............. 342/465 |
| 7,443,298 | B2 | * | 10/2008 | Cole et al. | ................ 340/572.4 |
| 2002/0070863 | A1 | * | 6/2002 | Brooking | .................. 340/572.1 |
| 2002/0126013 | A1 | * | 9/2002 | Bridgelall | ................ 340/572.1 |
| 2004/0108954 | A1 |   | 6/2004 | Richley et al. |  |
| 2005/0001720 | A1 |   | 1/2005 | Mason et al. |  |
| 2006/0119469 | A1 | * | 6/2006 | Hirai et al. | .................. 340/5.61 |
| 2006/0121851 | A1 | * | 6/2006 | Moore et al. | ............... 455/41.2 |
| 2006/0163349 | A1 |   | 7/2006 | Neugebauer | ................ 235/383 |
| 2006/0164237 | A1 | * | 7/2006 | Medve et al. | .......... 340/539.13 |
| 2006/0220851 | A1 | * | 10/2006 | Wisherd | .................. 340/568.1 |
| 2006/0232408 | A1 | * | 10/2006 | Nycz et al. | ............... 340/572.1 |
| 2007/0032250 | A1 | * | 2/2007 | Feher | ....................... 455/456.2 |
| 2007/0139191 | A1 | * | 6/2007 | Quatro | ................... 340/539.13 |
| 2007/0247366 | A1 | * | 10/2007 | Smith et al. | ................. 342/464 |
| 2007/0279237 | A1 | * | 12/2007 | Julian et al. | .............. 340/686.1 |
| 2008/0028230 | A1 | * | 1/2008 | Shatford | ..................... 713/186 |
| 2008/0109098 | A1 | * | 5/2008 | Moshier et al. | ............. 700/103 |
| 2008/0157970 | A1 | * | 7/2008 | Single et al. | ............. 340/572.1 |
| 2008/0198072 | A1 | * | 8/2008 | Elwell et al. | ................. 342/450 |

FOREIGN PATENT DOCUMENTS

WO    WO03/016938 A2    2/2003
WO    WO-03016938 A2 *    2/2003

* cited by examiner

*Primary Examiner*—Benjamin C Lee
*Assistant Examiner*—Quang Pham
(74) *Attorney, Agent, or Firm*—Ekkehard Schoettle

(57) ABSTRACT

A method for accounting for individuals in an emergency at industrial facilities utilizing Ultra-Wideband (UWB) transmitters associated with individuals or objects and UWB monitoring stations. Identification information received from the UWB transmitters by UWB monitoring stations are communicated along with time of arrival information to a computer which calculates the location of the UWB transmitter. The system can be used despite severe multi-path effects and can provide location information in 3 dimensions. The system can optionally include proximity-based RF equipment for access control or otherwise for identification in specific locations. Information from the proximity-based RF equipment is also sent to the computer which also receives information from the UWB monitoring stations.

6 Claims, 1 Drawing Sheet

MUSTERING POINT, 12

RF PROXIMITY READER, 13

PERSONNEL TAGGED WITH UWB TRANSMITTER AND RFID TAG, 15

UWB MONITORING STATION, 14

MUSTERING POINT, 22

RF PROXIMITY READER, 23

PERSONNEL TAGGED WITH UWB TRANSMITTER AND RFID TAG, 25

UWB MONITORING STATIONS, 24

MUSTERING POINT, 32

RF PROXIMITY READER, 33

PERSONNEL TAGGED WITH UWB TRANSMITTER AND RFID TAG, 35

UWB MONITORING STATIONS, 34

METHOD FOR ACCOUNTING FOR PEOPLE IN EMERGENCIES IN INDUSTRIAL SETTINGS

BACKGROUND OF THE INVENTION

This invention relates to systems and methods for accounting for individuals in emergencies in industrial settings using radio frequency identification.

Typically, in manufacturing facilities and similar settings, significant emphasis is placed on safety of people. Most jurisdictions have numerous regulations specifying minimum requirements and companies expend a great deal of effort and resources to improve the safety of such facilities.

In emergency situations, it is important to be able to account for individuals to appropriately direct rescue operations or take other actions in response to the emergency. As used herein, "emergency" or "emergency situation" means a situation in which a hazard condition is increased to a level sufficient to justify responsive action to mitigate the effects of such hazard. Examples of emergencies include fire, mechanical rupture, leakage of harmful gases or chemicals in an area, failure of protective structures or other change in the environment which change increases the hazard of the environment to an extent that jeopardizes the safety of individuals in or near the environment.

Many companies create response plans for emergencies. Typically, such response plans include instructions to remove non-essential individuals from the area of the increased hazard. One of the primary components in a typical response plan is to account for individuals, particularly individuals likely to be in the area of increased hazard. In many jurisdictions, government agencies may require that certain facilities have a method of accurately determining the location of people on site during and after emergencies. For example, in the United States, the Occupational Safety and Health Administration has promulgated regulations, such as 1910.38(c)(4), requiring certain facilities to have an emergency action plan that includes a procedure to account for all people on site during an emergency.

Commonly, accounting for individuals is performed by instructing individuals to gather at a specific location or locations, commonly referred to as mustering points, where a tally of the individuals is created, typically manually. Such tallies from mustering points are combined to determine whether all of the individuals have been accounted for. Combining the tallies typically involves communicating, either in person or by other means such as radio, with a command center or people charged with the duty to receive this information from the mustering points to form a consolidated tally. Such procedures are time consuming and prone to error. Delays in accounting for individuals can cause delays in directing appropriate response such as search and rescue efforts. Errors often lead to wasted time and resources and can unnecessarily jeopardize the safety of rescue personnel and of other individuals in need of aid.

Radio frequency identification (RFID) can be used as part of a method to account for individuals, particularly in case of an emergency. Unfortunately, RFID systems encounter significant difficulties providing accurate information in a setting in which a signal is subject to multiple reflective paths.

Radio frequency identification (RFID) technology has many applications ranging from toll road collection systems to asset management systems. Typically, an RFID system has one or more transmitters or transponders which are a combination of transmitter and receiver (also called "tags") and at least one receiver or "reader". Depending on the application, the receiver may also be accompanied by an additional transmitter and may thus be able to communicate with other devices. Such communication may use wires or may be wireless.

One of the major applications for RFID technology is to keep track of assets ranging from inventory to equipment or even people. In this type of application, the individual items which are to be tracked are attached to, co-located with, or otherwise associated with RFID tags.

RFID tags can be passive, semi-passive or active. Passive tags do not have an internal power source. A small electric current is generated by energy intercepted from an incoming radio frequency signal which provides enough power for the tag to send a responding signal. The tags' responding signal may simply be an identification number, however, passive tags can be designed to store additional information, for example in non-volatile memory. Such stored additional information may be transmitted by the tag in response to an incoming radio frequency signal or can be otherwise obtained from the tag. A device typically referred to as a reader, reads the signal from the tag. The reader may be part of the device which initially sent a signal to the RFID tag or it can be a separate device. The lack of an internal power source allows passive tags to be relatively small in comparison to other types of tags. However, the lack of internal power also limits the tag's signal strength. Typically, passive tags can not send a signal more than about 2 meters and the distance is usually much less.

Semi-passive tags, also prompted by an incoming radio frequency signal, contain a small battery allowing a more powerful response signal and, therefore, are typically easier to read than passive tags. Because a battery is present, semi-passive tags generally can not be made as thin as passive tags.

Active tags have an internal power source which allows the tag to send out a signal without being prompted by an incoming signal. Typically a signal is sent by an active tag on a predetermined periodic basis, for example every 2 seconds. However, some active tags may include sensors or other devices and may alter the pattern or content of its signal based on the data output from such sensors. For example, an active tag may be accompanied by a thermocouple device for sensing temperature. Such a tag could be programmed to start signaling only once a certain temperature is sensed. Such a tag could also be programmed to vary the period between tag transmissions depending upon the temperature sensed. Such a tag could also be programmed to alter a variety of other characteristics of its emitted signal based upon sensed temperature.

Passive tags are frequently used as identifications badges or for access control where a user brings the tag in the vicinity of a reader. Such a reader generally transmits a signal and elicits a response from the passive tag which includes information identifying the tag. The identification information is used, typically by other systems, to verify the credentials of the tag. Passive tags are also used for inventory control or theft deterrence wherein a tag is affixed to an article and, as the article and tag pass in the vicinity of a reader, the information may be logged or an alarm triggered.

Active tags are commonly used on vehicles as a method to pay tolls. Typically, the tag passes within range of a reader which reads the signal and sends the information to a gateway or central computer which charges the toll to the user's account.

Another example of use is described in U.S. Published Patent Application 2004/0160323 which describes use of RFID transponders for a security system. U.S. Published Patent Application 2005/0024183 describes an RFID tag which is part of a uniform or other clothing and is used for identification.

There is great interest in using RFID technology to locate objects or people. EP 1,566,756 describes a system for tracking objects. JP2004288119 describes use of RFID technology to track entry/exit of people for security and safety purposes.

A common method of tracking inventory or people using RFID tags is to use passive tags and place RFID readers in locations where such inventory or people are expected to pass, for example at doorways or other points of entry or egress. However, such a system is limited in that it can only determine that the object or person passed near the reader. For such a system to continue to provide location information, readers would need to be placed throughout the entire coverage area. But readers for passive RFID tags have a very limited range, typically less than one meter, so it is impractical to track inventory or people in a large area. It is also impractical in an area with a large number of entryways or in an open area. Active RFID systems can be used to locate an object or person in an area so that actual location can be determined. However such systems often have great difficulty in determining location with an accuracy of one meter or less. This difficulty is greatly increased in a setting where there are multiple reflective paths which a signal may take before reaching a reader. For this reason, RFID location systems have not been useable in dense metal areas found in industrial settings such as a petroleum refinery, petrochemical plant, or other similar environments to provide accurate location information of people or objects. In such settings, signal quality degradation and signal reflection interfere with the ability to accurately locate a person or item within processing units or similar environments densely populated with metal equipment or structures. There is a need for a system for accurately locating people or items in such industrial settings.

A possible system which could be considered to account for people is a proximity-based system. Such a system typically requires each individual to either swipe an identification card through a reader or bring an identification card within a few inches of a reader, a process commonly referred to as "swiping in" or "swiping out" of a location. Unfortunately, people often neglect to swipe in or out of a location or often follow another individual who has swiped in or out without swiping in or out themselves (known as "piggybacking"). Such occurrences can lead to severe difficulties during emergencies and can expose rescue personnel to unnecessary dangers. For example, if a person neglects to swipe out of a location, rescue personnel responding to an emergency may believe that the individual is still in that location and may engage in an unneeded search and rescue operation.

The problem of people neglecting to swipe in or out of a location is compounded in an emergency because people trying to exit a location as swiftly as possible are less likely to take the additional time and effort required to swipe out of the location. As noted above, such a condition can lead to misinformation regarding an individual's location and can result in misdirection of rescue efforts. Additionally, in many industrial sites, proximity based systems could only be effectively used in enclosed or fairly contained areas. Such systems are not effective at accounting for individuals in open areas or in areas without specific exit points. An additional undesirable result of relying on a proximity based system is that requiring individuals to swipe in and out of every location, even when retrieving a tool or taking a break, etc., can lead to wasted time and effort and overall work inefficiencies.

In an effort to require people to swipe in and out of a location, some locations include electronic turn-style type gates, typically a proximity-based RFID system, which an individual must use to enter and exit a location. Such a system is not effective in many industrial settings because an area may not have specified entrance and exit points. Additionally, such turn-styles are typically designed to automatically remain open in an emergency situation to allow occupants to exit a location quickly which greatly reduces the accuracy in accounting for the occupants.

Other systems for accounting for individuals in emergencies involve manual identification of individuals at specified muster locations. Such manual systems require communication between mustering stations or to a central location at which a complete tally of individuals can be generated to compare with a list of individuals known to be on site.

Because of such signal degradation and general difficulty in using RFID to locate individuals in environments densely populated with metal, such as those found in industrial environments, many facilities rely on a manual system where designated individuals record identities of people at specified mustering points. Such systems are typically time consuming and are prone to error because individuals may not show up at a designated muster station or may not be counted due to manual error. Furthermore, such systems do not provide any information about the current locations of individuals that were not accounted for at mustering stations.

Because of the significant inaccuracies in such manual systems, in some cases, individuals may be accidentally omitted from the tally or may otherwise not be accounted for. Often, no reliable information is available as to the individuals' present whereabouts or last known whereabouts. This can result in wasted time and effort spent in locating individuals who are not in danger. In some scenarios, emergency rescue personnel may be unnecessarily exposed to significant hazards searching for an unaccounted for individual because of misinformation as to the individual's possible location.

Ultra wideband (UWB) systems have been described in U.S. Pat. Nos. 6,054,950, 6,882,315 and 7,209,523 which are each fully incorporated by reference herein. U.S. Pat. No. 6,882,315 describes an UWB architecture designed to locate objects and compensate for phase skew between counters of multiple monitoring stations in which counters are used to measure differential arrival times of received signals. U.S. Pat. No. 6,054,950 describes an UWB system for object location over large areas. U.S. Pat. No. 7,209,523 describes a wide variety of techniques for the design of UWB transmitters and receivers which can be used in object location systems.

We have discovered a method for accounting for individuals in emergencies useable in industrial settings such as refineries, petrochemical plants, and other facilities that have areas densely populated with metal structures or equipment. We have discovered that UWB systems can be adapted to operate in an industrial setting, such as a refinery or chemical plant, and can effectively locate objects and people despite signal degradation and multi-path signals and can be used as part of a method to account for people in emergencies.

SUMMARY OF THE INVENTION

We have discovered that an UWB based RFID system can be used to locate people or objects in an industrial setting such as a petroleum refinery, manufacturing plants such as a petrochemical plant, or other similar settings to locate individuals during an emergency. Such UWB systems can be made to accurately locate a tag in three dimensions despite signal attenuation and multiple signal pathways which generally occur in dense metal areas environments of industrial settings.

In an embodiment, the invention provides a method of accounting for individuals in an emergency at an industrial facility. The method includes the steps of associating a UWB transmitter with an individual; co-locating the UWB transmitter and the individual; transmitting from the UWB transmitter, a UWB signal; receiving the UWB signal by at least two UWB monitoring stations; communicating from the at least two UWB monitoring stations, at least information identifying the UWB transmitter and time-of-arrival information; and computing, using a computer and information communicated from the at least two UWB monitoring stations, the UWB transmitter's location. Preferably, the computer is in communication with an output device and is capable of generating a list comprising identity information and location information of individuals at the industrial facility.

In some embodiments, the method may also include the steps of associating a passive RFID tag with the individual; emitting from an RF proximity transceiver, an RF signal capable of eliciting from the passive RFID tag a responding signal including information identifying the passive RFID tag; and communicating from the RF proximity transceiver information identifying the passive RFID tag to the computer.

In another embodiment, this invention provides a method of accounting for individuals in an emergency. The method includes the steps of associating an individual with a co-located UWB transmitter; defining a mustering location having one or more UWB monitoring stations positioned so as to be capable of determining whether or not the co-located UWB transmitter is within the mustering location; identifying an emergency event requiring individuals to report to the mustering location; and determining whether or not the individual has reported to the mustering location by determining whether or not the co-located UWB transmitter is within the mustering location.

Optionally, the method may include the steps of defining a zone encompassing the emergency event wherein sufficient UWB monitoring stations are positioned to determine whether or not the co-located UWB transmitter is within the zone; and determining whether or not the individual is within the zone by determining whether or not the co-located UWB transmitter is within the zone. Preferably, at least a portion of the sufficient UWB monitoring stations are within the zone.

Alternatively, the method may further comprise the steps of associating a passive RFID tag with the individual; and eliciting an RF signal from the passive RFID tag using an RF proximity transceiver wherein the RF signal includes information identifying the RF tag; wherein determining whether or not the co-located UWB transmitter is within the mustering location includes determining the last known location of the passive RFID tag.

In some embodiments, the invention provides a system for locating people or objects in an industrial setting. The system includes a UWB transmitter located on or in proximity to a person or object to be located and located in an industrial setting; at least three UWB monitoring stations in different known locations; a metal structure positioned such that a radio frequency signal transmitted by the UWB transmitter is reflected around all or a portion of the metal structure before reaching at least one of the UWB monitoring stations; and a computer in communication with the UWB monitoring stations; wherein the UWB monitoring stations are capable of receiving a UWB signal from the UWB transmitter, obtaining from the UWB signal identification information identifying the UWB transmitter communicating the identification information and time of arrival information to the computer and wherein the computer is capable of using the identification information and time of arrival information to calculate location of the person or object to be located.

In any of the embodiments, a rule may be applied to the calculated location of the person or object to be located, or the individual, to determine whether an alert should be generated in response to the calculated location. Optionally, the computer may compare the calculated location with authorized locations for the person or object to be located or the individual.

In some embodiments, the system also includes a passive RFID tag co-located with the UWB transmitter; and at least one RF proximity transceiver capable of transmitting a signal causing the passive RFID tag to emit a responding signal; wherein the RF proximity transceiver is capable of obtaining identification information identifying the passive RF tag from the responding signal and communicating identification information identifying the passive RF tag and time of arrival information to the computer. Optionally, the RF proximity transceiver is also capable of comparing identification information obtained from the responding signal to predetermined authorized identities. In some embodiments, the computer compares the identification information communicated by the RF proximity transceiver with information communicated from the UWB monitoring stations to verify that the UWB transmitter is transmitting UWB signals.

DESCRIPTION OF THE PREFERRED EMBODIMENT(S)

Figure 1:
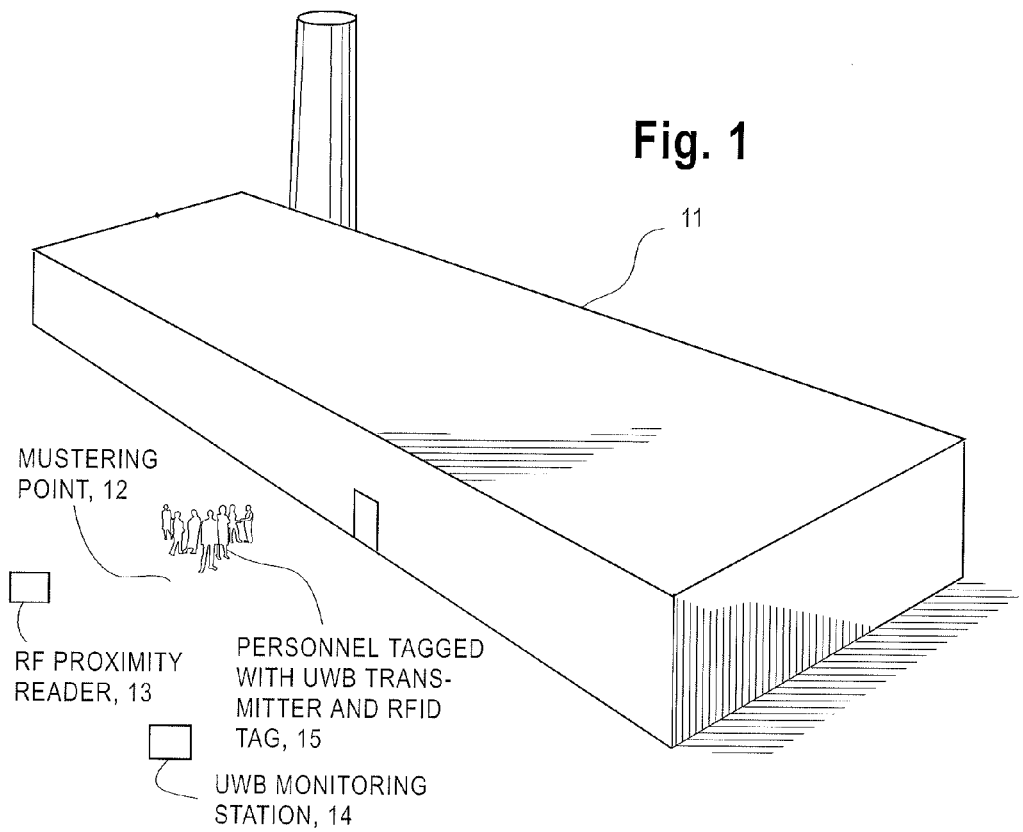
FIG. 1 shows a representation of an industrial setting with personnel tagged with a UAB transmitter and a passive RFID tag at a mustering point adjacent an RF proximity reader and a single UWB monitoring station.

This invention provides a method for accounting for individuals during emergencies in industrial settings. The method utilizes a system for area-wide tracking of people and objects in industrial settings. As used herein, "industrial setting" means an area such as a manufacturing facility, plant, refinery, drilling platform or similar area having areas where there is an increased incidence of signal reflection and attenuation primarily due to high concentration of metal in the architecture and equipment of such areas. Industrial settings have not been able to employ area-wide location systems and obtain reliable location information in areas densely populated with metal equipment or structures. By "area-wide" location system, we mean a system which can be used to accurately determine the position of people or objects in a specified large area, typically hundreds or thousands of square meters, as opposed to a "proximity-based" system in which a tag must be brought into proximity, typically one meter or less, of a reader.

The method provided by this invention comprises the steps of associating individuals with RFID tags capable of emitting UWB signals which signals include information identifying the tags. The tags typically emit such UWB signals on an intermittent basis. The intermittent basis may be a set interval or may vary and can optionally change over time, for example in response to sensors or other data.

The method includes detecting the tag signals by at least 2 UWB monitoring stations which monitoring stations are at known locations. Location of the monitoring stations may be known absolutely with respect to the industrial facility or may be known relative to other monitoring stations or some other reference location.

The method also includes communicating at least tag identification information and one or more of time-of-arrival information and angle-of-arrival information from the UWB monitoring stations to a computer. As used herein, computer refers to a device capable of processing information using mathematical algorithms.

The method includes using triangulation algorithms or algorithms based upon time-of-arrival or time-differences of arrival to calculate the location of the tag using information from the UWB monitoring stations. The identification of the tag can be used to identify the individual associated with the tag and such information can be stored, displayed or otherwise processed including any combinations thereof.

The methods provided by this invention generally utilize at least one RFID tag which generates UWB signals and several, typically at least 2 and preferably at least 3, UWB monitoring stations. The tags are typically active RFID tags which periodically transmit UWB signals, also referred to as UWB tags. UWB monitoring stations are RF sensors which receive the UWB signals emitted by the tags and communicate information identifying the UWB tags and time-of arrival information to a gateway or other device for further routing or processing. Other information may also be communicated for example, angle of arrival information, environmental condition information or combinations of various types of information. The UWB tags may also transmit other information which may be communicated to the UWB monitoring station and may be transmitted by the UWB monitoring station to the computer. The monitoring stations are placed at predetermined locations throughout the area to be monitored. Typically, reference tags affixed at known locations within the area to be monitored are also used as described, for example, in the '315 patent.

Tags can be affixed or otherwise co-located with or near people or objects to be tracked. The tags emit UWB signals which are received by UWB monitoring stations. The monitoring stations communicate the received signal, typically including time-of-arrival information and tag identification, to a computer. Such communication may be wired or wireless and may be routed through intermediate devices. Examples of UWB tags and UWB monitoring stations useful for the method of this invention includes those described in U.S. Pat. No. 6,054,950, U.S. Pat. No. 6,882,315, U.S. Pat. No. 6,882,315 and U.S. Pat. No. 7,209,523.

A computer receives the information from the monitoring stations and calculates the location of the tag using triangulation algorithms. The information from the monitoring stations can be subjected to intermediate processing prior to receipt of the processed information by the computer and references to devices communicating information to another device is intended to include processing or altering of the information by intermediate devices. Typically, accurate location of a tag in 2 dimensions requires that at least 3 monitoring stations receive a signal from a particular tag. However, some systems are capable of providing location in 2 dimensions using just 2 monitoring stations. For accurate location in 3 dimensions, typically at least 4 monitoring stations must receive a signal from a particular tag and at least one of the 4 monitoring stations must be in a different plane from the other 3 monitoring stations.

A UWB signal pulse is emitted from the tag preferably at a periodic rate, for example every second or every 2 seconds. The rate at which the tag emits a UWB pulse will typically be selected based upon several factors including desired battery life of the tag, desired rate of updated information and expected movement rate of the objects or people to be tracked. A slower pulse rate will tend to increase battery life by reducing power consumption. Increasing the pulse rate will increase power consumption but may lead to improved detail for location tracking because a particular tag's location will be updated more frequently. Additionally, if a tag is expected to move more rapidly, then increasing the pulse frequency is typically beneficial to increase temporal accuracy because tag location can be updated more frequently.

Most RFID location systems require line-of-site or near line-of-site between a tag emitting a signal and monitoring stations receiving the signal. By line-of-site is meant that an un-reflected signal must be able to be transmitted from the tag to the monitoring station and by near line-of-site is meant that a signal with minimal or only minor reflection must be able to be transmitted from a tag to a monitoring station. In an industrial setting, particularly in an outdoor or predominantly outdoor environment, it is particularly difficult to position the needed 3 or 4 monitoring stations to provide adequate coverage so that desired tag location accuracy can be achieved. In contrast, the system of this invention employs a short UWB pulse from which information can be obtained from the leading edge of the pulse and which does not require line-of-sight or near line-of-sight transmission between a tag and the monitoring stations.

After determining the location of a tag, the computer can store the information or communicate it to other devices. Such communication can be wired but is preferably wireless. The information is preferably communicated to a server where it can be stored for immediate or later use. For example, the location information may be used by being visually displayed on a monitor, a screen or printed media. The information can also be used to generate reports or analyze patterns. Location information can also be analyzed according to set of predetermined rules. Such rules can be used to generate alerts. For example, a set of rules may generate an alert if a tag is in a certain area for greater than a specified amount of time. This is particularly useful in industrial settings where there may be areas detrimental to health of people or integrity of objects.

The method and system provided by this invention also provides industrial sites an accurate way to account for personnel in the event of an incident which could be a danger to health or safety of people at the site. In an embodiment of this invention, the location information is used to account for individuals during or after an emergency. In such embodiment, location information can be in a printed report, displayed on a monitor or screen or otherwise displayed such that an operator can review the information to determine the current or last known location of individuals. For example, location information may be superimposed on a map or map-like representation of the facility such that an operator can determine which individuals are located in the vicinity of a hazard. This information allows expedient and appropriate direction of response personnel and other resources.

The last known location of an individual can be identified such that, even if a tag is no longer functioning, response personnel can be directed to the last known location to determine the individual's status and provide aid if needed.

In an embodiment of this invention, UWB tags are associated with individuals in an industrial facility and are provided to individuals as part of identification badges. UWB monitoring stations are placed at known locations throughout the facility and communicate, preferably wirelessly, with a central server. The UWB monitoring stations are placed such that in areas where personnel may be located on different levels and vertical location accuracy is desired, monitoring stations are not all in the same plane. Often, 3-dimensional location is only desired in selected areas and so in those areas, monitoring stations are placed such that at least one monitoring station which receives a signal from a tag is in a different plane from at least 3 other monitoring stations which also receive the signal from the tag. The pulse rate of the UWB signal emitted by the badges can be adjusted as desired but is typically approximately once per second. Such a pulse rate allows for accurate location of personnel in most environments and conserves battery life.

Arrangement of the UWB monitoring stations depends on the physical layout and constraints of the facility and the desired particularity of the location information. A facility may have zones or areas within which the desired level of accuracy differs. For example, it may be sufficient merely to know that a particular individual is in a particular area or with a particular piece of manufacturing equipment such as a reactor area or compressor shed. As further example, a facility may be divisible into zones and some zones may not require the same level of accuracy as other zones such as roads, administration facilities, worker recreation facilities, cafeterias, etc. Such areas may have less coverage, generally referred to as sparse coverage or zone coverage, than areas in which greater accuracy is desired which will typically have more coverage, generally called dense coverage or location coverage.

In some embodiments, UWB monitoring stations in hazardous areas such as areas containing dangerous processing equipment and the like, are arranged to provide dense coverage and UWB monitoring stations in areas such as cafeterias or employee break stations are arranged to provide sparse coverage.

Information from UWB signals received by monitoring stations are transmitted along with information such as time of arrival information and monitoring station identification information to a server or other information processing equipment. Such transmission may be through intermediate devices which may process or modify the signal. Such server or information processing equipment, upon receiving information about a particular tag from multiple monitoring stations uses triangulation algorithms to calculate the location of the tag. This information is periodically updated as new information is obtained from monitoring stations.

Location information can then be stored, displayed, filtered, processed, analyzed, transmitted elsewhere or any combination thereof. Location information can be analyzed in accordance with predetermined rules and optionally generate alerts or perform other actions in response to such analysis. For example, a rule may specify that only certain tags are allowed in certain areas and may generate an alert if an unauthorized tag is present in a restricted area. As further example, a rule may specify that a particular tag must be within a predetermined distance from another specific tag or tags and an alert may be generated when that particular tag remains apart from the other specified tag or tags for more than a particular period of time and may optionally only apply to specified areas of the facility. Such rules can be particularly helpful to ensure that visitors are properly escorted in areas of a facility which require escorts. For example, a visitor may not be required to be with an escort in administrative buildings or support facilities such as cafeteria, recreation are, etc. but such visitor may be required to have an escort in hazardous or otherwise sensitive areas. Such rules are also useful to ensure compliance with other guidelines.

In some embodiments, tags are accompanied by sensors which communicate information to the tag. The tag may transmit information based upon the input from a sensor. For example, a sensor may communicate information to a tag when certain gases are or are not present at specified levels and the tag may communicate such information in its UWB packet burst. Such information is in turn received by monitoring stations and communicated to a server or processing equipment which may generate an alert.

In some embodiments, a sensor may be designed to sense the presence of particular types of energy, for example radioactivity, or may be designed to sense vibration or noise, and information is communicated via the UWB tag regarding the tag's exposure to such energy, vibration or noise. This information can be used, immediately or at a later time, to adjust personnel assignments or otherwise address issues concerning a particular employee's exposure to such energy, vibration or noise.

In embodiments where accurate location within a zone is not required but accurate information about which zone a particular tag is in is desired, areas between zones may be provided with dense coverage while the zones themselves may have sparse or no coverage. For example, walkways or roadways may separate zones and such walkways or roadways may be provided with dense coverage to accurately locate a tag leaving one zone and entering another. In some embodiments, it may be equipment areas in which greatest accuracy is desired and lesser accuracy may be acceptable for roadways or walkways.

In some embodiments, some zones have sparse or no coverage in areas where it is sufficient to know that an individual is in such zones or in an area of such zones. For example, a facility may have an area or building adjacent to a densely covered area such that, even without any coverage in that area or building, an individual's presence in the area can be inferred because the individual was detected in the adjacent densely covered area moving towards the area without coverage and was last detected at or near the edge of the dense coverage area. As long as that individual is not detected in any other location, it can be inferred that the individual is still in the area or building without coverage. As further example, a building, structure or zone may be have sparse coverage such that it is sufficient if only 1 or 2 UWB monitoring stations receive UWB signals from a tag. In such situations, a tag can be known to be in such building, structure, zone or region thereof covered by the 1 or 2 UWB monitoring stations until the tag is located in densely covered areas where more accurate location information can be determined.

In some embodiments of this invention, areas of an industrial facility having decreased risk of hazards are sparsely covered with UWB monitors and areas having increased risk are densely covered with UWB monitors.

In some embodiments, some areas have sparse or no coverage within the areas, even if such areas have high risk of hazards. In such embodiments, regions between areas with sparse or no coverage are densely covered such that an individual's location is known to the extent movement across the densely covered area is tracked.

In some embodiments of this invention a facility can have one or more designated gathering points, commonly referred to as mustering locations or mustering stations. The mustering locations can contain as few as 1 UWB monitor. If just 1

UWB monitor is used for the mustering location, the obtainable location information is typically limited to a UWB transmitter's (and the co-located individual's) presence in the area of the UWB monitoring station. Alternatively, some mustering locations may have more than 1 UWB monitoring station to provide more location information regarding individuals in the vicinity of the UWB monitoring stations.

In some embodiments, an industrial facility may have UWB monitors only in the mustering locations or in other targeted areas, for example choke points or particularly hazardous areas. In such embodiments, individuals may only be located while in the mustering locations or other targeted areas.

In some embodiments, at least a portion of the UWB monitors may remain inactive or may operate at a reduced level of activity much of the time. For example, UWB monitoring stations at mustering locations may be inactive or may operate in a low-powered mode until an emergency event occurs. Upon receiving a signal indicating the occurrence of an emergency, such UWB monitoring stations at mustering locations may become fully operational to aide in accounting for individuals during the emergency.

In some embodiments, at least a first set of 2 UWB monitors are positioned so as to establish a boundary region of a zone and at least second set of 2 UWB monitors are positioned so as to establish a boundary region of an adjacent zone. In such embodiments, location of an individual by the first set may not provide enough information to establish the individual's location and movement, however, subsequent location of the individual by the second set would indicate that the individual has passed from the first zone to the adjacent zone.

UWB tags can be associated with objects and persons. In some embodiments, certain equipment, for example safety equipment, is affixed with UWB tags to locate the equipment. Furthermore, the computer can be programmed to compare an individual's location and the location of certain equipment and either generate an alert or otherwise initiate a response. For example, if a person is required to have specific safety equipment on before accessing an area, the location of a UWB tag associated with the person can be compared with the location of a UWB tag associated with the needed equipment to generate an alert if the person enters the area without the safety equipment or if the person and the equipment are separated when in the area.

In certain embodiments, sensors are in communication with the UWB tag and the signal transmitted by the UWB tag can contain additional information based upon input from the sensors. For example, a temperature sensor can either regularly communicate temperature information to a UWB tag or can transmit such information upon reaching predetermined thresholds which the UWB tag can transmit to the UWB monitors. Such a sensor may be co-located and even wired into the UWB tag or sensors can be located at fixed locations. Such fixed sensors may communicate information to the processing unit directly or through means other than the UWB monitoring stations and such sensors may be part of separate and distinct systems within the industrial facility. Information from such sensors can be used be the processing unit to combination with calculated location information.

In some embodiments, sensors may be co-located with UWB tags and the sensor may alter the signal rate of the UWB tag. For example, UWB monitors or other devices may be designed to emit signals to alter the signal rate either in response to specific events or as the tag enters specific areas. As further example, UWB monitors may be designed to emit a signal increasing the UWB tag signal rate in the event of an emergency. In such cases, the increased signal rate of the UWB tag allows more accurate tracking of the tag during such an emergency. Optionally, UWB monitors, or other transmitters, at mustering locations can emit a signal reducing the UWB tag signal rate back to its standard rate. Such embodiments allow heightened accounting ability during emergencies to provide improved accuracy and more frequent location information updates. Such embodiments would provide such improved accounting while avoiding the constant power demand that would result if the tag were continuously operating at the increased signal rate. In some embodiments, sensors may initiate deactivation or reduced power operation of the tag, for example when leaving a designated area or a facility.

In some preferred embodiments, a UWB area-wide location system is used in combination with a proximity-based system. In such embodiments, a UWB transmitting tag and a conventional RF tag are used in combination. Preferably, a UWB transmitting tag and a conventional RF tag are part of a single device such as an identification badge. The conventional RF tag may be active or semi-passive but is preferably passive. Such dual-tag devices are particularly useful to account for people in emergencies.

In such combination systems, gateways, doors and other similarly secured entryways can be equipped with proximity-based RF readers designed to unlock such entryways to allow access. If a passive or semi-passive conventional RF tag, referred to herein as simply an RF tag, is used, such RF readers are designed to emit an RF signal which causes the RF tag to emit a responding signal when the tag is in close proximity to the reader, typically less than a meter, and which responding signal is received by the RF reader. If an active conventional RF tag is used, the RF tag may be designed to emit a signal periodically, preferably a short-range signal in the range of one meter or less, which signal is received by the RF reader. Such signal emitted by the conventional RF tag includes identification information which is received by the RF reader. The identification information is then checked to determine whether the particular RF tag is authorized to access the entryway. The checking can be performed using a processor co-located with the RF reader to provide rapid response or can be performed by a remote computer. Preferably the RF reader compares the RF tag identity to authorized identities stored in memory and also communicates the identity, and preferably time information as well, to a computer. The RF reader can also be in communication with apparatus for locking/unlocking or opening/closing the entryway.

In such preferred embodiments, the UWB tag periodically emits signals which are received by UWB monitoring stations which may be present in the area as described above. Information from the RF readers and the UWB monitoring stations is combined to provide location information.

Such combination systems permit access control to secured areas while still allowing location tracking of individuals. Advantageously, such combination systems are more effective at providing both access control and location tracking. To provide accurate access control using solely an area-wide UWB system, increased numbers of UWB monitoring stations may be needed around the access point or the UWB tag may need to emit signals more frequently than otherwise desired for location tracking. For example, if a locked gate is used to control access to a restricted area, it is desirable to have the gate unlock only when an authorized individual actually desires entry rather than simply unlocking when an authorized individual merely passes near the gate. To determine whether an authorized individual desires entry using solely an area-wide location system, the location of the individual would require increased accuracy and frequent updates to determine whether the individual is moving in a manner indicating the intent to enter. An area-wide UWB location system as described herein allows sufficient accuracy and update frequency even in an industrial setting. However, increased frequency of signal from the UWB tag reduces the battery life and such high level of location accuracy is typically not required except for such access control which may require denser coverage of the area around the gate.

In some cases, it may not be desirable to know the location of individuals within certain access-controlled areas. For example, an industrial site may have administrative buildings or other facilities which have limited entrances and, for an individual in such facility, it may be sufficient to know that the individual is in the facility. A combination system can be used such that proximity based RF readers are placed at entryways. Although such RF readers can require swiping in our swiping out, it is not necessary for the RF readers to be able to distinguish between an entering individual and a leaving individual. Because such combination systems include UWB area-wide location, the area-wide location system can determine whether an individual entered or exited the facility. Even if area-wide coverage does not include the facility interior, whether an individual entered or exited the facility can be determined by the absence of the individual's signal within the coverage area. This eliminates the need for turn-styles or other similar systems which can distinguish between an entrance event and an exit event. Optionally, such administrative buildings or other facilities may also be sparsely covered by UWB monitors.

An additional benefit of combination systems is that a combination system can be used to detect piggybacking. With a proximity system alone, a person may be able to open a gate and allow others to pass through and the person may not necessarily pass through the gate. With a combination system as described herein, Information from the UWB monitors can be used to determine the location of the individuals.

In some embodiment, a device having a UWB tag and a passive conventional RF tag is correlated with an individual. UWB area-wide coverage is provided except within certain facilities which facilities have distinct entry points. Proximity-based RF readers are placed at such entry points and the RF readers emit a signal designed to excite the conventional RF tag and cause the RF tag to emit a responding signal including identification information. Signals emitted by the RF readers can have an effective range of several meters but preferably the signal effective range is one meter or less. The UWB tag periodically emits a UWB signal which includes identification information and which is received by UWB monitor stations. While within the UWB coverage area, location of the device is determined from the information obtained through the UWB monitoring stations. As the device passes near a proximity based RF reader at an entry point, location of the device is also known from information received from the RF reader, although typically with less accuracy than from the information received from the UWB monitoring stations. If the UWB signal is thereafter not received by sufficient UWB monitors to determine the device location, then it can be deduced that the device entered the facility through the entry point and is now within the facility and outside the UWB coverage area. Entrance and exit can be distinguished even in the absence of UWB area-wide coverage within the facility by the combination of information from a proximity-based RF reader and the UWB monitoring stations. In cases in which piggybacking takes place, information from the UWB monitoring stations (or lack thereof) can be used to accurately determine which devices entered the facility and which devices did not.

Information from both the proximity-based portion of such combination systems and the UWB area-wide portion of such combination systems can be collected at a computer to provide an accurate assessment of location. In some such embodiments, the computer compares the identity and location determined via the proximity-based portion of the system to information received from the UWB area-wide portion to determine if signals from the device's UWB tag are being received. This can be helpful to provide notice when the power supply of the UWB tag fails. This is particularly effective when a passive conventional RF tag is used in combination with the UWB tag because the passive conventional RF tag does not require an internal power source. For example, an identification badge can be provided which has a conventional passive RF tag and a UWB tag. When an individual carrying the identification badge uses it to enter the industrial facility or otherwise signal a proximity RF reader, the processing unit can verify that UWB monitoring stations are receiving signals from the UWB tag. If no UWB signals are received, then an alert can be generated so that the lack of signals can be investigated.

In some embodiments of such a combination systems, location information from the proximity-based portion of the system is simply compared with location information from the UWB area-wide portion of the system and a report or alert generated when discrepancies occur.

In some embodiments, the UWB area-wide location system is deployable on a non-permanent basis such that UWB monitoring stations are designed to either contain or attach to a power source or otherwise connect to commonly available power supplies. Additionally, some or all of the monitoring stations communicate wirelessly with a unit for processing and/or routing the communicated information. In such embodiments, the UWB monitoring stations are deployed when needed throughout an area where coverage is desired. Upon deployment, exact location of each monitoring station is identified and reference UWB tags are deployed and the reference tags' locations identified. Such deployable systems are particularly useful during high-risk operations such as equipment turn-around or during repair or construction. Such deployable systems are also useful for conducting studies such as work-efficiency or movement patterns or similar situations or in situations where valuable moveable objects are brought into an area such as particularly valuable tools which can be tracked.

Figure 2:
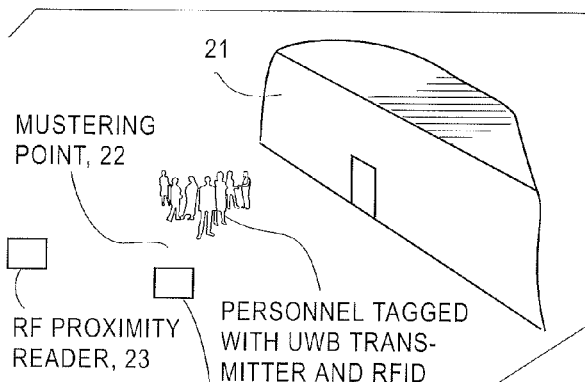
FIG. 2 shows a representation of an industrial setting with personnel tagged with a UWB transmitter and a passive RFID tag at a mustering point adjacent an RF proximity reader and two UWB monitoring stations.
Figure 3:
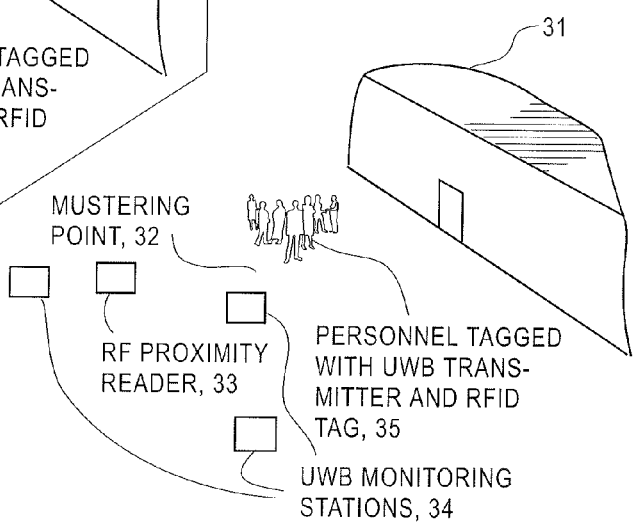
FIG. 3 shows a representation of an industrial setting with personnel tagged with a UWB transmitter and a passive RFID tag at a mustering point adjacent an RF proximity reader and three UWB monitoring stations.

FIG. 1 depicts an industrial setting 11 and a mustering point 12 external to the industrial setting 11, with an RF proximity reader 13 and a single UWB monitoring station 14 adjacent to the mustering point 12, and personnel 15 tagged with both a UWB transmitter and a passive RFID tag gathered at the mustering point 12. FIG. 2 depicts an industrial setting 21 and a mustering point 22 external to the industrial setting 21, with an RF proximity reader 23 and two UWB monitoring stations 24 adjacent to the mustering point 22, and personnel 25 tagged with both a UWB transmitter and a passive RFID tag gathered at the mustering point 22. FIG. 3 depicts an industrial setting 31 and a mustering point 32 external to the industrial setting 31, with an RF proximity reader 33 and three UWB monitoring stations 34 adjacent to the mustering point, and personnel 35 tagged with both a UWB transmitter and a passive RFID tag gathered at the mustering point 32.

In other embodiments, the UWB area-wide location system of this invention is used in combination with other location systems such as GPS or WiFi based systems.

As a specific example, test evaluations and deployments were conducted to determine the functionality of various technologies for area-wide location tracking in industrial settings. Several criteria were evaluated for different technologies including: the ability to provide accurate information in a dense metal environment; the availability of tags which are certified for use where flammable gases may be present (class 1, division 2); the availability of a tag size acceptable to for personnel to carry or wear; battery life of tag measured in years with location updates every 3 seconds or less; horizontal accuracy of better than 3 meters and sufficient vertical accuracy to determine which level a tag was on; and reasonable equipment requirements.

Several technologies were investigated and tested including RF signature, proximity detection, time difference of arrival using standard radio transmission, time difference of arrival using UWB radio transmission and certain combinations and variations such as combining time difference of arrival method with angle of arrival.

RF Signature—An RF signature system attempts to use a WiFi network to determine location. Individual tags include receivers and transmitters. Each tag in an RF signature system detects characteristics of the WiFi radio environment at the tag's location. Typically such characteristics include signal strength and waveform information about each detected signal. The RF signature tag then communicates information to a computer, typically also using the WiFi network. The computer compares this with an RF signature information with a known map of the WiFi environment of the facility to determine the location. The map is created upon system installation by taking measurements throughout the facility. An RF signature system was tested at a chemical plant. Such a system achieved average accuracy of 9 meters and was not able to determine location in 3 dimensions. Additionally, tags were relatively large such that personnel found them cumbersome and had battery life of only several weeks. Furthermore, as the physical environment of the facility alters, for example from scaffolding, construction, large trucks and other occurrences common in industrial sites, the RF map becomes invalid and must be re-acquired.

Proximity Detection—Proximity systems work by detecting that a tag is nearby. To achieve 3 meter accuracy with a proximity system, a very dense grid of receivers is required, typically as dense as every 5 meters or even denser. Because industrial facilities are often large, typically covering several acres, this density is impractical in most such settings.

A proximity detection system was tested at a refinery. The system was made up of small battery powered transceivers which form a mesh network and communicate information regarding detected tags through the mesh network to a server. The communication operated at 2.4 GHz, using a short-range zigbee mesh network. The tags were class 1 division 2 certified for use in the refinery. Transceivers were placed in the area of a reformer at the refinery. The transceivers were added one at a time in a 5 meter grid. At first, the system provided location information of tags within the grid and was able to determine location of a tag with approximately 5 meter accuracy. However, as the number of transceivers increased beyond 15, the transceiver signals degraded to a point that none of the transceivers could communicate with each other, even the original 15 that were previously able to locate tags. It was determined that the disruption was due to multi-path signal reflection.

Time Difference of Arrival Using Standard Radio—Time difference of arrival is a method of triangulation used by many systems. A signal is issued by the tag and received by multiple receivers at slightly different times. The time difference is used to calculate the tag's location.

One such system available through WhereNet employs a technique called Direct Sequence Spread Spectrum to cope with multi-path signals. A WhereNet system was tested at a refinery storage lot and was able to located tags to an accuracy which ranged from about 3 meters to about 5 meters. However, the system was not able to determine location in 3 dimensions and the tags emitted signals every 6 seconds. Additionally, the system vendor determined that the system would not work in the dense metal areas of the processing units and would only be useable in the areas between units.

Time Difference of Arrival Using Ultra-wide band Radio—An UWB area-wide system was tested at the refinery using equipment available from Multispectral Solutions Inc. The system was first tested in a storage lot at the refinery. The system was able to located UWB tags and achieved accuracy in the range of 1 to 2 meters. Additionally, the system was able to locate tags in 3 dimensions. The system used UWB tags which transmit at center frequency of 6.35 GHz with a spread of about 500 MHz. UWB monitoring stations communicates data to a central processing unit which calculated the location of the tags and made the information available in TCP/IP data form. The system also relies upon one or more UWB "reference tags" which are the same as the other UWB tags but are fixed at known locations.

The UWB system was then tested in the reformer unit at the refinery. The monitored area was approximately 200 feet by 400 feet and include two large decks above ground level and several smaller decks and platforms. Nine UWB monitoring stations were installed throughout the unit. One was placed in the southeast corner at ground level and another was placed 50' above it. Another pair were placed similarly in the south-central/southwest area and another pair were placed along west side near the center of the area. A single monitoring station was placed about 20 feet high near the center of the east side; one was placed about 50 feet high at the north end and one was placed about 20 feet high just south of the center of the reformer unit. All nine of these monitoring stations were in NEMA7 (National Electrical Manufacturers Association) explosion proof enclosures which are class 1, division 2 certified. The enclosures had UWB antennas extending from the top on a short coaxial cable.

A processing hub was installed in the reformer area at the south end of one of the large decks, about 30' above ground. The hub was connected to the 9 monitoring stations by CAT5 Ethernet cables which were inside metal conduit. Power to the monitoring stations was provided at 48V through the CAT5 cables (Power over Ethernet). A WiFi bridge was used to allow wireless communication between the processing hub and a computer located in a shelter across the street from the reformer.

Another four monitoring stations were set up outside and to the east of the reformer unit in a rectangle. These four monitoring stations were not in areas requiring class 1, division 2 classification and so were not in NEMA7 enclosures. These four additional monitoring stations were set up on tripods each day of the testing. These monitoring stations were connected to each other by shielded CAT5 cable. Power was provided to one of the monitoring stations by an A/C adapter, then from that monitoring stations to the others using Power-over-Ethernet. The A/C powered monitoring station also had an AeroComm 2.4 GHz transmitter to communicate wirelessly with a processing hub which was in communication with the computer located in the shelter.

The computer processed the information from the hubs and calculated the locations of UWB tags in the coverage area. From the shelter, the location information could be accessed from the computer.

Twenty-five (25) one-watt UWB tags were used for the test. These tags were operating under an experimental license obtained from the Federal Communications Commission because only 30 mW tags were licensed for outdoor use. Three additional one-watt tags were used as reference tags—two within the reformer area and one outside the reformer.

Land-surveyor techniques were used to accurately record the locations of the monitoring stations and reference tags and were also used to mark 25 locations for position accuracy tests.

The tests showed that the UWB system was able to determine location of UWB tags with accuracy within 2 m, often well within 1 m. The system was also able to identify which level of the unit a tag was on. The frequency of updated location information was more than once every 2 seconds.

The above tests and evaluations showed that most technologies could not provide location information of persons or objects in an industrial environment and only a UWB area-wide location system as provided by this invention was able to provide location information in such industrial setting.

From the foregoing description, it will be observed that numerous variations, alternatives and modifications will be apparent to those skilled in the art. Accordingly, this description is to be construed as illustrative only and is for the purpose of teaching those skilled in the art the manner of carrying out the invention. Various changes may be made in the design of the equipment or system. Moreover, equivalent elements may be substituted for those illustrated and described. Steps of the method may be performed continuously or distinctly and may be separated by time and location. For example, tag identification information received by UWB monitoring station and corresponding time-of-arrival information may be stored by the monitoring station for later delivery or communication or may be communicated to another location for storage. Such a system is particularly useful if real-time information is not desired, for example in the case where the system was being used to conduct work efficiency studies. As further example, additional sensors, processors and other apparatus may be used in combination with the tags, monitoring stations and processing units of the systems.

Thus, it will be appreciated that various modifications, alternatives, variations, and changes may be made without departing from the spirit and scope of the invention as defined in the appended claims.

That which is claimed is:

1. A method of accounting for individuals in an emergency at an industrial facility, the method comprising the steps of:
   a) associating an active area-wide UWB transmitter and a passive proximity-based RFID tag with an individual;
   b) co-locating the active UWB transmitter, the passive RFID tag and the individual;
   c) transmitting from the UWB transmitter, a short UWB pulse as a signal;
   d) receiving the UWB signal by at least two UWB monitoring stations;
   e) communicating from the at least two UWB monitoring stations to a computer, at least information identifying the UWB transmitter and time-of-arrival information;
   f) emitting from an RF proximity transceiver, an RF signal capable of eliciting from the passive RFID tag a responding signal including information identifying the passive RFID tag;
   g) communicating to said computer information from the RF proximity transceiver identifying the passive RFID tag; and
   h) computing, using the computer and information communicated from the at least two UWB monitoring stations and from the RF proximity transceiver, the UWB transmitter's location and the identity of the associated individual;
   i) applying steps a)-h) for a plurality of individuals;
   wherein the computer is in communication with an output device and is capable of generating a list comprising identity information and location information of individuals at the industrial facility.

2. A method of accounting for individuals in an emergency, the method comprising the steps of:
   a) associating an individual with an active area-wide co-located UWB transmitter that transmits a short UWB pulse as a signal and a co-located passive proximity-based RFID tag;
   b) defining a mustering location having a UWB monitoring station positioned so as to be capable of determining whether or not the co-located active UWB transmitter is at the mustering location;
   c) identifying an emergency event requiring the individual to report to the mustering location;
   d) determining whether or not the individual has reported to the mustering location by determining whether or not the active co-located UWB transmitter is at the mustering location; and
   e) generating a report comprising identity information and location information of the individual;
   f) wherein determining whether or not the active co-located UWB transmitter is at the mustering location includes eliciting an RF signal from the passive RFID tag using an RF proximity transceiver at the mustering location wherein the RF signal includes information identifying the passive RF tag.

3. A system for locating people or objects in an industrial setting, the system comprising:
   a) an active area-wide UWB transmitter that transmits a short UWB pulse as a signal and a passive proximity-based RFID tag located on or in proximity to a person or object to be located in an industrial setting;
   b) at least three UWB monitoring stations in different known locations;
   c) a metal structure positioned such that a radio frequency signal transmitted by the active UWB transmitter is reflected around all or a portion of the metal structure before reaching at least one of the UWB monitoring stations; and
   d) a computer in communication with the at least three UWB monitoring stations; and e) at least one RF proximity transceiver capable of transmitting a signal causing the passive RFID tag to emit a responding signal;
   wherein the RF proximity transceiver is capable of obtaining identification information identifying the passive RF tag from the responding signal and communicating identification information identifying the passive RF tag and time of arrival information to the computer;
   wherein the computer compares the identification information communicated by the RF proximity transceiver with information communicated from the UWB monitoring stations to verify that the UWB transmitter is transmitting UWB signals; and
   wherein the at least three UWB monitoring stations are capable of receiving a short UWB pulse signal from the UWB transmitter, obtaining from the UWB signal identification information identifying the UWB transmitter communicating the identification information and time of arrival information to the computer and wherein the computer is capable of using the identification information and time of arrival information to calculate location of the person or object to be located.

4. The system of claim 3 wherein a rule is applied to the calculated location of the person or object to be located to determine whether an alert should be generated in response to the calculated location of the person or object to be located.

5. The system of claim 3 wherein the computer compares the calculated location of the person or object to be located with authorized locations for the person or object to be located.

6. The system in claim 3 wherein the RF proximity transceiver is further capable of comparing identification information obtained from the responding signal to predetermined authorized identities.

* * * * *